(12) United States Patent
Suzuki

(10) Patent No.: US 9,315,616 B2
(45) Date of Patent: Apr. 19, 2016

(54) BLOCKED PREPOLYMERS AND ACRYLIC PLASTISOL COMPOSITIONS COMPRISING THE BLOCKED PREPOLYMERS

(75) Inventor: Masayuki Suzuki, Kawasaki (JP)

(73) Assignee: Dow Global Technologies LLC, Midland, MI (US)

( * ) Notice: Subject to any disclaimer, the term of this patent is extended or adjusted under 35 U.S.C. 154(b) by 160 days.

(21) Appl. No.: 14/122,123

(22) PCT Filed: Jul. 23, 2012

(86) PCT No.: PCT/US2012/047810
§ 371 (c)(1),
(2), (4) Date: Nov. 25, 2013

(87) PCT Pub. No.: WO2013/016265
PCT Pub. Date: Jan. 31, 2013

(65) Prior Publication Data
US 2014/0135436 A1    May 15, 2014

Related U.S. Application Data

(60) Provisional application No. 61/511,838, filed on Jul. 26, 2011.

(51) Int. Cl.
| | |
|---|---|
| *C08L 33/00* | (2006.01) |
| *C08G 18/12* | (2006.01) |
| *C08G 18/48* | (2006.01) |
| *C08G 18/50* | (2006.01) |
| *C08G 18/76* | (2006.01) |
| *C08G 18/83* | (2006.01) |

(52) U.S. Cl.
CPC ............. *C08G 18/831* (2013.01); *C08G 18/12* (2013.01); *C08G 18/482* (2013.01); *C08G 18/4841* (2013.01); *C08G 18/5021* (2013.01); *C08G 18/7621* (2013.01); *C08L 33/00* (2013.01); *C08G 2190/00* (2013.01)

(58) Field of Classification Search
CPC .............. C08G 18/831; C08G 18/4841; C08G 18/5021; C08G 18/7621; C08G 18/12; C08G 18/482; C08G 2190/00; C08L 33/00; C08K 5/12
See application file for complete search history.

(56) References Cited

U.S. PATENT DOCUMENTS

| | | | |
|---|---|---|---|
| 3,248,371 A | * | 4/1966 | Damusis ............... C08G 18/10 524/874 |
| 4,150,211 A | | 4/1979 | Muller et al. |
| 4,182,825 A | | 1/1980 | Jackle |
| 4,294,951 A | | 10/1981 | Sugita et al. |
| 4,373,081 A | | 2/1983 | Nachtkamp et al. |
| 4,446,293 A | | 5/1984 | Konig et al. |
| 4,555,562 A | | 11/1985 | Lee et al. |
| 4,605,772 A | | 8/1986 | Darby et al. |
| 4,624,996 A | | 11/1986 | Rizk et al. |
| 4,694,051 A | * | 9/1987 | Kordomenos ......... C08G 18/10 525/437 |
| 5,130,402 A | | 7/1992 | Akiyama et al. |
| 5,219,975 A | | 6/1993 | Schmalstieg et al. |
| 5,246,557 A | | 9/1993 | Hughes et al. |
| 5,276,125 A | | 1/1994 | Pedain et al. |
| 6,153,709 A | | 11/2000 | Xiao et al. |
| 6,355,761 B1 | | 3/2002 | Figge et al. |
| 6,809,147 B1 | | 10/2004 | Ohno et al. |
| 2005/0282990 A1 | | 12/2005 | Schoenfeld et al. |
| 2011/0004241 A1 | | 1/2011 | Wintermantel et al. |

FOREIGN PATENT DOCUMENTS

| | | |
|---|---|---|
| EP | 1371674 A1 | 12/2003 |
| JP | 07252446 A | 10/1995 |
| JP | 09012516 A | 1/1997 |
| JP | 09031412 A | 2/1997 |
| JP | 2000038567 A | 2/2000 |
| JP | 2006097018 A | 4/2006 |
| WO | 2004/074343 A1 | 9/2004 |

OTHER PUBLICATIONS

PCT/US2012/047810, International Preliminary Report on Patentability dated Jan. 28, 2014.
PCT/US2012/047810, Written Opinion of the International Searching Authority dated Jan. 26, 2014.
PCT/US2012/047810, International Search Report dated Oct. 18, 2012.

* cited by examiner

*Primary Examiner* — Patrick Niland

(57) ABSTRACT

The invention generally relates to blocked prepolymers. More specifically, the invention generally relates to plastisol compositions comprising the blocked prepolymers. The blocked prepolymer is the reaction product of at least an isocyanate terminated prepolymer and a blocking agent, wherein the blocking agent is a nitrogen containing blocking agent. The isocyanate terminated prepolymer is the reaction product of at least one or more polyols comprising at least one polyol having an amine initiator and a stoichiometric excess of one or more organic polyisocyanate components.

14 Claims, No Drawings

BLOCKED PREPOLYMERS AND ACRYLIC PLASTISOL COMPOSITIONS COMPRISING THE BLOCKED PREPOLYMERS

BACKGROUND OF THE INVENTION

1. Field of the Invention

Embodiments of the invention relate to blocked prepolymers. More specifically, embodiments of the invention relate to plastisol compositions comprising blocked prepolymers.

2. Description of the Related Art

Polyvinyl chloride (PVC) resins, suspensions, dispersions or emulsions are commonly dispersed in liquid plasticizers (with other additives) to form a plastisol. PVC-based plastisols have been widely used as an automotive and heavy machine chip-resistant undercoat, a body sealer, and an electrodeposition coating for wire-coating applications. However, PVC-based plastisols are alleged to present challenges to the environment and health. Recently, environmentally friendly plastisol formulations such as acrylic-based plastisol compositions have been accepted as substitutes for PVC-based plastisols by some automotive and heavy machinery manufacturers.

Acrylic-based plastisol compositions are thermoplastic and require heat and time for fusion. Thus, when the plastisol cures in a car production line, high temperatures of at least 130° C. are required to cure the plastisol into the undercoat membrane. Typically, curing the plastisol comprises preheating the plastisol for approximately ten minutes at 90° C. and curing the plastisol at 140° C. for approximately thirty minutes. Such high temperatures lead to both an increase in the energy required and a corresponding increase in the production time required.

Thus it is desirable to provide a lower temperature curing system to reduce both energy consumption and production time.

SUMMARY OF THE INVENTION

Embodiments of the invention relate to blocked prepolymers. More specifically, embodiments of the invention relate to plastisol compositions comprising blocked prepolymers that cure at temperatures around 120° C. In one embodiment, a blocked prepolymer is provided. The blocked prepolymer is the reaction product of at least an isocyanate terminated prepolymer and a blocking agent. The isocyanate terminated prepolymer is the reaction product of at least one or more polyols comprising at least one polyol having a secondary or tertiary amine initiator and a stoichiometric excess of one or more organic polyisocyanate components.

In another embodiment, an acrylic plastisol composition is provided. The acrylic plastisol composition is the reaction product of a blocked prepolymer, one or more acrylic powders, one or more plasticizers, one or more amine crosslinkers, and optionally, one or more fillers. The blocked prepolymer is the reaction product of an isocyanate terminated prepolymer and a blocking agent. The isocyanate terminated prepolymer is the reaction product of one or more polyols comprising at least one polyol having a secondary or tertiary amine initiator and a stoichiometric excess of one or more organic polyisocyanate components.

DETAILED DESCRIPTION

Embodiments of the invention relate to blocked prepolymers. More specifically, embodiments of the invention relate to plastisol compositions comprising the blocked prepolymers.

The term "prepolymer" as used herein designates a reaction product of monomers which has remaining reactive functional groups to react with additional monomers to form a polymer.

The term "elongation" as applied to a polymer not in the form of a foam is used herein to refer to the percentage that the material specified can stretch (extension) without breaking. The result is expressed as a percentage of the original length of the polymer sample and is tested in accordance with the procedures of ISO 37:1994 unless stated otherwise.

The term "tensile strength" as applied to a polymer not in the form of a foam is used herein to refer to a measure of how much stress that the material specified can endure before suffering permanent deformation. The result is typically expressed in Paschals (Pa) or pounds per square inch (psi) and is tested in accordance with the procedures of ISO 37:1994 unless stated otherwise.

As used herein, "polyol" refers to an organic molecule having an average of greater than 1.0 hydroxyl groups per molecule. It may also include other functionalities, that is, other types of functional groups.

The term "hydroxyl number" indicates the concentration of hydroxyl moieties in a composition of polymers, particularly polyols. A hydroxyl number represents mg KOH/g of polyol. A hydroxyl number is determined by acetylation with pyridine and acetic anhydride in which the result is obtained as the difference between two titrations with KOH solution. A hydroxyl number may thus be defined as the weight of KOH in milligrams that will neutralize the acetic anhydride capable of combining by acetylation with 1 gram of a polyol. A higher hydroxyl number indicates a higher concentration of hydroxyl moieties within a composition.

The term "functionality" particularly "polyol functionality" is used herein to refer to the average number of active hydroxyl groups on a polyol molecule. As used herein, the functionality for polyols is the nominal functionality, i.e., the number of reactive groups present on the initiator.

The polyol used in forming the prepolymer of the present invention are initiated with an initiator containing a tertiary or secondary amine whereby upon alkoxylation of the initiator, the secondary amine is converted to a tertiary amine. The presence of the tertiary amine in the polyol is believed to help catalyze reactions involving the isocyanate, such as reaction with hydroxyl, carboxylic acid and/or amine groups. Thus such prepolymers contain some self-catalytic activity. It has been found that plastisols comprising the self-catalytically active blocked prepolymers described herein cure at temperatures around 120° C. and posses superior elongation and tensile strength while maintaining comparable hardness relative to plastisols formed without the blocked prepolymers described herein. The inventive active blocked prepolymers which are incorporated with an amine initiated polyol provide improved physical properties in comparison with currently available blocked prepolymers.

Prepolymer Formation:

In one embodiment, a blocked prepolymer is provided. The blocked prepolymer comprises (a) an isocyanate terminated prepolymer and (b) a blocking agent. The isocyanate terminated prepolymer (a) is the reaction product of at least (1) one or more polyols comprising at least one polyol having a secondary amine initiator or tertiary amine initiator and (2) a stoichiometric excess of one or more organic polyisocyanate components.

Component (a) used to prepare the blocked prepolymer includes (1) one or more polyols comprising at least one polyol having an amine. The at least one polyol having an amine may have an average molecular weight of from 1,000 to 12,000 Daltons, preferably from 1,500 to 8,000, and more preferably from 2,000 to 6,000 and is obtained by alkoxylation of an initiator comprising at least one molecule of the formula:

$$H_mA\text{-}(CH_2)_n\text{—}N(R)\text{—}(CH_2)_p\text{-}AH_m \qquad (I)$$

wherein n and p are independently integers from 2 to 6;
A at each occurrence is independently oxygen or nitrogen;
R is a $C_1$ to $C_3$ alkyl group; and
m is 1 when A is oxygen and m is 2 when A is nitrogen;
or of the formula

$$H_2N\text{—}(CH_2)_t\text{—}N(R)\text{—}H \qquad (II)$$

where t is an integer from 2 to 12 and
R is a $C_1$ to $C_3$ alkyl group.

In a preferred embodiment of Formula I, R is methyl. In another preferred embodiment R is methyl and n and p are integers of the same value. In a more preferred embodiment n and p are an integer of 2 to 4. In one embodiment one A will be oxygen and the other A will be nitrogen, and the final polyol will be a triol. In yet another embodiment, A is nitrogen in all occurrences and the final polyol will be a tetrol.

The alkyl amines of Formula I are commercially available or can be made by techniques known in the art, such as U.S. Pat. No. 4,605,772, the disclosure of which is incorporated herein by reference. For example, methylamine is reacted with the appropriate alkylene oxide for producing compounds where A is oxygen. Preferably the alkylene oxide is ethylene oxide (EO), propylene oxide (PO), or butylene oxides (BO), which gives a preferred range of 2 to 4 for n when each A is oxygen. Example of such initiator compounds are N-methyldiethanolamine, N-methyldipropanolamine, N-methyldibutanol-amine, and N-methylethanol-propanolamine.

For producing compounds where each A is nitrogen, a methyl amine can be reacted with any known reactive group that reacts with an amine and contains additional nitrogen. For example, 2 moles of $X(CH_2)_nNR'R''$ can be reacted with one mole of methylamine where X represents chlorine, bromine or iodine; R' and R'' can be H or an alkyl group; and n is as defined above. Examples of such initiator compounds include 3,3'-diamino-N-methyldipropylamine, 2,2'-diamino-N-methyldiethylamine, and 2,3-diamino-N-methyl-ethyl-propylamine.

For producing compounds where one A is nitrogen and one A is oxygen, one can use a process such as the one described in JP 09,012,516, the disclosure of which is incorporated herein by reference.

In one embodiment of Formula II, R is methyl. Preferably t in Formula II is an integer of 2 to 10, more preferably t is an integer of 2 to 6 and most preferred t is an integer of 2 to 4. In a preferred embodiment, R is methyl and m is an integer of 2 to 4. Compounds of Formula II can be made by standard procedures known in the art. Examples of commercially available compounds of Formula II include N-methyl-1,2-ethanediamine and N-methyl-1,3-propanediamine.

The production of polyols by alkoxylation of an initiator can be done by procedures well known in the art. In general, a polyol is made by the addition of an alkylene oxide (EO, PO, or BO), or a combination of alkylene oxides to the initiator by anionic or cationic reaction or use of double metal cyanide (DMC) catalyst. For some applications only one alkylene oxide monomer is used, for other applications a blend of monomers is used and in some cases a sequential addition of monomers is preferred, such as PO followed by an EO feed or EO followed by PO.

The polyol having an amine initiator may be methylimino bis-propylamine initiated EO/PO polyoxyalkylene ether copolymer. The polyol having an amine initiator may have a hydroxyl number from 20 to 225, from 30 to 150, from 35 to 100, from 40 to 75 and in one embodiment from about 50 to about 60 mg KOH/g, for example, about 57 mg KOH/g. The polyol having an amine initiator may have a number average equivalent weight from 250 to 3,000, preferably from 750 to 1,500, more preferably about 1,000. The polyol having an amine initiator may have a nominal functionality of at least three, and in another embodiment, a nominal functionality of four. The polyol having an amine initiator may be a self-catalytically active polyol.

Exemplary polyols having an amine initiator are available from the Dow Chemical Company under the trade name VORANOL™VORACTIV™ polyols. VORANOL™VORACTIV™ polyols are amine initiated polyols typically used for adhesives, sealants, flex and molding foam applications. Suitable commercially available products of that type include VORANOL™VORACTIV™ 7000 which is available from the Dow Chemical Company.

The polyol having an amine initiator may comprise at least 1 wt. %, 3 wt. %, 5 wt. %, 7 wt. %, 9 wt. %, 10 wt. %, or 13 wt. % of the blocked prepolymer. The polyol having an amine initiator may comprise up to 3 wt. %, 5 wt. %, 7 wt. %, 9 wt. %, 10 wt. 13 wt. %, or 15 wt. % of the blocked prepolymer. In certain embodiments, the polyol having an amine initiator may comprise from 1 wt. % to about 10 wt. % or from 1 wt. % to 5 wt. % of the blocked prepolymer.

The polyol having an amine initiator may be used alone or can be blended with other known polyols to produce polyol blends. Representative polyols for blends with the polyol having an amine initiator include polyether polyols, polyester polyols, and polyalkylene carbonate-based polyols. Polyether polyols may be prepared by adding an alkylene oxide, such as ethylene oxide, propylene oxide, butylene oxide or a combination thereof, to an initiator having from 2 to 8 active hydrogen atoms. The functionality of polyol(s) used in a formulation will depend on the end use application as known to those skilled in the art. For example, typically polyols suitable for polymer formulation include those having an average molecular weight of 100 to 10,000 and preferably 3,500 to 5,500. Such polyols advantageously have a functionality of at least 2, preferably 3, and up to 8, preferably up to 6, active hydrogen atoms per molecule. The polyols used for prepolymer formation generally have a hydroxyl number of about 10 to about 200 mg KOH/g and more preferably from about 30 to about 60 mg KOH/g. The one or more polyether polyols may comprise a polyoxypropylene triol. Exemplary polyether polyols are available from the Dow Chemical Company under the trade name VORANOL™. Suitable commercially available products of that type include VORANOL™ 4701 and VORANOL™ 230-042 both of which are available from the Dow Chemical Company.

The representative polyols for blends with the polyol having an amine initiator may comprise at least 40 wt. %, 45 wt. %, 50 wt. %, 55 wt. %, 60 wt. %, 65 wt. %, 70 wt. %, 75 wt. %, 80 wt. %, 85 wt. %, or 90 wt. % of the blocked prepolymer. The representative polyols for blends with the polyol having an amine initiator (a) may comprise up to 45 wt. %, 50 wt. %, 55 wt. %, 60 wt. %, 65 wt. %, 70 wt. %, 75 wt. %, 80 wt. %, 85 wt. %, 90 wt. %, or 95 wt. % of the blocked prepolymer. In certain embodiments, the polyols blended with the polyol having an amine initiator may comprise from 75 wt. % to about 95 wt. % or from 80 wt. % to 90 wt. % of the blocked prepolymer.

Component (2) may comprise one or more organic polyisocyanate components. The one or more organic polyisocyanate components may have an average of 1.8 or more isocyanate groups per molecule. The isocyanate functionality is preferably from about 1.9 to 4, and more preferably from 1.9 to 3.5 and especially from 2.0 to 3.3. Exemplary polyisocyanates include, for example, m-phenylene diisocyanate, 2,4- and/or 2,6-toluene diisocyanate (TDI), the various isomers of diphenylmethanediisocyanate (MDI), and polyisocyanates having more than 2 isocyanate groups, preferably MDI and derivatives of MDI such as biuret-modified "liquid" MDI products and polymeric MDI (PMDI), 1,3 and 1,4-(bis isocyanatomethyl)cyclohexane, isophorone diisocyanate (IPDI), hexamethylene diisocyanate (HDI), bis(4-isocyanatocyclohexyl)methane or 4,4' dimethylene dicyclohexyl diisocyanate (H12MDI), xylylene diisocyanate (XDI), and combinations thereof, as well as mixtures of the 2,4- and 2,6-isomers of TDI, with the former most preferred in the practice of the invention. A 65/35 weight percent mixture of the 2,4 isomer to the 2,6 TDI isomer is typically used, but the 80/20 weight percent mixture of the 2,4 isomer to the 2,6 TDI isomer is also useful in the practice of this invention and is preferred based on availability. Suitable TDI products are available under the trade name VORANATE™ which is available from The Dow Chemical Company and CORONATE T100 manufactured by Nippon Polyurethane Industry Co., Ltd. Other preferred isocyanates include methylene diphenyl diisocyanate (MDI) and or its polymeric form (PMDI) for producing the prepolymers described herein. Such polymeric MDI products are available from The Dow Chemical Company under the trade names PAPI® and VORANATE®. Suitable commercially available products of that type include PAPI™ 2940 which is available from The Dow Chemical Company.

The organic polyisocyanate may be used in a stoichiometric excess (NCO:OH) of at least about 1.05:1, preferably at least about 1.10:1, more preferably at least about 1.20:1, and at most about 4:1, leaving a prepolymer having isocyanate functionality.

The organic polyisocyanate component may comprise at least 1 wt. %, 5 wt. %, 10 wt. %, 15 wt. %, 20 wt. %, or 25 wt. % of the blocked prepolymer. The organic polyisocyanate component may comprise up to 5 wt. %, 10 wt. %, 15 wt. %, 20 wt. %, 25 wt. %, or 30 wt. % of the blocked prepolymer. In certain embodiments, the organic polyisocyanate component may comprise from 5 wt. % to 20 wt. % by weight of the blocked prepolymer.

The isocyanate-terminated prepolymer for use in the present inventions may be prepared by standard procedures well known to a person skilled in the art as disclosed in U.S. Pat. Nos. 4,294,951; 4,555,562; 4,182,825 or PCT Publication WO2004074343. The components are typically mixed together and heated to promote reaction of the polyols and the polyisocyanate. The reaction temperature will commonly be within the range of about 30° C. to about 150° C.; and generally from about 60° C. to about 100° C. The reaction is advantageously performed in a moisture-free atmosphere. An inert gas such as nitrogen, argon or the like can be used to blanket the reaction mixture. If desired, an inert solvent can be used during preparation of the prepolymer, although none is needed. A catalyst to promote the formation of urethane bonds may also be used. In one embodiment, a urethane bond promoting catalyst is not present. For producing the blocked prepolymers, the blocking agent may be added during the formation of the prepolymer.

Catalysts are typically used in small amounts, for example, each catalyst being employed from 0.0015 to 5% by weight of the total reaction system. The amount depends on the catalyst or mixture of catalysts and the reactivity of the polyols and isocyanate as well as other factors familiar to those skilled in the art.

Although any suitable catalyst may be used. A wide variety of materials are known to catalyze prepolymer reactions including amine-based catalysts and tin-based catalysts. Preferred catalysts include tertiary amine catalysts and organotin catalysts. Examples of commercially available tertiary amine catalysts include: trimethylamine, triethylamine, N-methylmorpholine, N-ethylmorpholine, N,N-dimethylbenzylamine, N,N-dimethylethanolamine, N,N-dimethylaminoethyl, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used.

Examples of commercially available amine catalysts include NIAX™ A1 and NIAX™ A99 (bis(dimethylaminoethyl)ether in propylene glycol available from Momentive Performance Materials), NIAX™ B9 (N,N-dimethylpiperazine and N—N-dimethylhexadecylamine in a polyalkylene oxide polyol, available from Momentive Performance Materials), DABCO® 8264 (a mixture of bis(dimethylaminoethyl)ether, triethylenediamine and dimethylhydroxyethyl amine in dipropylene glycol, available from Air Products and Chemicals), DABCO 33LV® (triethylene diamine in dipropylene glycol, available from Air Products and Chemicals), DABCO® BL-11 (a 70% bis-dimethylaminoethyl ether solution in dipropylene glycol, available from Air Products and Chemicals, Inc), NIAX™ A-400 (a proprietary tertiary amine/carboxylic salt and bis(2-dimethylaminoethyl)ether in water and a proprietary hydroxyl compound, available from Momentive Performance Materials); NIAX™ A-300 (a proprietary tertiary amine/carboxylic salt and triethylenediamine in water, available from Momentive Performance Materials); POLYCAT® 58 (a proprietary amine catalyst available from Air Products and Chemicals), POLYCAT® 5 (pentamethyl diethylene triamine, available from Air Products and Chemicals) and POLYCAT® 8 (N,N-dimethyl cyclohexylamine, available from Air Products and Chemicals).

Examples of organotin catalysts are stannic chloride, stannous chloride, stannous octoate, stannous oleate, dimethyltin dilaurate, dibutyltin dilaurate, other organotin compounds of the formula $SnR_n(OR)_{4-n}$, wherein R is alkyl or aryl and n is 0-2, and the like. Organotin catalysts are generally used in conjunction with one or more tertiary amine catalysts, if used at all. Commercially available organotin catalysts of interest include KOSMOS® 29 (stannous octoate from Evonik AG), DABCO® T-9 and T-95 catalysts (both stannous octoate compositions available from Air Products and Chemicals).

Component (b) may comprise one or more blocking agents. The one or more blocking agents may be nitrogen containing blocking agents. Suitable blocking agents include ketoximes of hydroxylamines, ketones, phenols, pyrazole, lactam, imines and amines. Ketones include but are not limited to acetone, methyl ethyl ketone, diethyl ketone, cyclohexanone, acetophenone and benzophenone. Examples of oximes include, for example, methylethylketone oxime, methylethyl ketoxime, acetone oxime, acetaldoxime, formaldoxime and cyclohexanone oxime. Representative examples of lactams include ε-caprolactam, -butyrolactam, δ-valerolactam and pyrrolidone. Other lactams which may be used as a blocking agent are as those described in U.S. Pat. No. 4,150,211. Examples of phenols include phenol, and phenol derivatives such as cresol, ethylphenol, butylphenol, nonylphenol, dinonylphenol, styrenated phenol, and hydroxybenzoic acid esters. Examples of amine blocking agents are diphenylamine, aniline and carbazole. Examples of imine blocking agents include ethyleneimine and polyethyleneimine. Pyrazole blocking agents which may be used in the present invention are described for example in U.S. Pat. No. 5,246,557, and include alkyl substituted pyrazole blocking agents such as 3,5-dimethylpyrazole. In a further embodiment, the blocking agent is an amine containing blocking agent. In a further embodiment, the blocking agent is a nitrogen containing blocking agent. Preferably, the blocking agent is methyl ethyl ketoxime (MEKO) (butanone oxime).

The blocking agent is to be used in an amount such that the equivalents of the groups of the blocking agent that are suitable for isocyanate blocking correspond to at least 60 mol %, preferably 75 mol %, more preferably 85 mol % and very preferably more than 95 mol % of the amount of isocyanate groups to be blocked. A small excess of blocking agent may be advantageous in order to ensure complete reaction of all isocyanate groups. In general the excess is not more than 20 mol %, preferably not more than 15 mol % and more preferably not more than 10 mol %, based on the isocyanate groups to be blocked. With very particular preference, therefore, the amount of blocking agent groups suitable for NCO blocking is 95 mol % to 110 mol %, based on the amount of the isocyanate groups of the polyurethane prepolymer that are to be blocked.

The blocking agent may comprise at least 1 wt. %, 3 wt. %, 5 wt. %, 7 wt. %, 9 wt. %, 10 wt. %, or 13 wt. % of the blocked prepolymer. The blocking agent may comprise up to 3 wt. %, 5 wt. %, 7 wt. %, 9 wt. %, 10 wt. %, 13 wt. %, or 15 wt. % of the blocked prepolymer. In certain embodiments, the organic polyisocyanate component may comprise from 1 wt. % to 10 wt. % or from about 1 wt. % to 5 wt. % of the blocked prepolymer.

The blocked prepolymer for use in the present inventions may be prepared by standard procedures well known to a person skilled in the art. The components are typically mixed together and heated to promote reaction of the prepolymer and the blocking agent. The reaction temperature will commonly be within the range of about 10° C. to about 100° C.; and generally from about 30° C. to about 60° C. The reaction temperature may be less than 50° C. A catalyst to promote blocking may be used.

Plastisol Composition:

In another embodiment, an acrylic plastisol composition is provided. The acrylic plastisol composition is the reaction product of a blocked prepolymer, one or more acrylic powders, one or more plasticizers, optionally one or more fillers, and one or more amine cross-linkers.

The blocked prepolymer may comprise a polyol having an amine initiator as previously described herein.

The blocked prepolymer comprising a polyol having an amine initiator may comprise at least 5 wt. % 10 wt. %, 15 wt. %, 20 wt. %, 25 wt. %, 30 wt. %, 35 wt. %, 40 wt. %, or 45 wt. % of the acrylic plastisol composition. The blocked prepolymer comprising a polyol having an amine initiator may comprise up to 10 wt. %, 15 wt. %, 20 wt. %, 25 wt. %, 30 wt. %, 35 wt. %, 40 wt. %, 45 wt. %, or 50 wt. % of the acrylic plastisol composition. In certain embodiments, the polyol having an amine initiator may comprise from 5 wt. % to about 50 wt. % or from 1 wt. % to 5 wt. % of the acrylic plastisol composition.

The acrylic plastisol composition may further comprise one or more acrylic powders for providing physical strength. Any suitable acrylic powder may be used in the acrylic plastisol composition. Exemplary acrylic powders include polymers from acrylic vinyl monomers, α,βethylenic unsaturated carboxylic esters, diene type monomers, vinyl ester monomers, vinyl cyanides, α,βethylenic unsaturated carboxylic acids and epoxy type monomers.

The one or more acrylic powders may comprise at least 10 wt. %, 15 wt. %, 20 wt. %, 25 wt. %, 30 wt. %, 35 wt. %, 40 wt. %, 45 wt. %, or 50 wt. % of the acrylic plastisol composition. The one or more acrylic powders (b) may comprise up to 15 wt. %, 20 wt. %, 25 wt. %, 30 wt. %, 35 wt. %, 40 wt. %, 45 wt. %, 50 wt. %, or 55 wt. % of the acrylic plastisol composition. In certain embodiments, the one or more acrylic powders may comprise from 10 wt. % to about 40 wt. % or from 20 wt. % to 30 wt. % of the acrylic plastisol composition.

The acrylic plastisol composition may further comprise one or more plasticizers. Any suitable plasticizer may be used in the acrylic plastisol composition. The plasticizer may be of any of the phthalate ester types such as Di-Isononylphthlate (DINP), Di-Isodecylphthlate (DIDP) or PALITINOL® available from BASF Corporation and may be of any type known to those skilled in the art of plastisol formulations.

The acrylic plastisol composition may further comprise one or more plasticizers. The one or more plasticizers may comprise at least 15 wt. %, 20 wt. %, 25 wt. %, 30 wt. %, 35 wt. %, 40 wt. %, or 45 wt. % of the acrylic plastisol composition. The one or more plasticizers may comprise up to 20 wt. %, 25 wt. %, 30 wt. %, 35 wt. %, 40 wt. %, 45 wt. %, or 50 wt. % of the acrylic plastisol composition. The plasticizer is preferably provided in an approximate amount of between about 15% and about 50% by weight and more preferably, in an approximate amount of between about 15% and about 30% by weight of the acrylic plastisol composition.

The acrylic plastisol composition may further comprise one or more fillers for, inter alia, controlling rheology and improving tensile strength, modulus strength, and sheer strength. In addition, fillers may be used to improve abrasion resistance and to lower cost. Any suitable filler may be used. Suitable fillers include particulate inorganic and organic materials that are stable and do not melt at the temperatures encountered during the plastisol-forming reaction. Preferably, the fillers may be selected from the group comprising kaolin, montmorillonite, calcium carbonate, mica, wollastonite, talc, high-melting thermoplastics, glass, fly ash, carbon black, titanium dioxide, iron oxide, chromium oxide, azo/diazo dyes, phthalocyanines, dioxazines, and combinations thereof. Other suitable cost lowering and rheology-controlling fillers can be used.

The one or more fillers may comprise at least 20 wt. %, 25 wt. %, 30 wt. %, 35 wt. %, 40 wt. %, 45 wt. %, 50 wt. %, or 55 wt. % of the acrylic plastisol composition. The one or more fillers may comprise up to 25 wt. %, 30 wt. %, 35 wt. %, 40 wt. %, 45 wt. %, 50 wt. %, 55 wt. % or 60 wt. % of the acrylic plastisol composition. In certain embodiments, the one or more fillers may comprise from 25 wt. % to about 60 wt. % or from 30 wt. % to 40 wt. % of the acrylic plastisol composition.

The acrylic plastisol composition may further comprise one or more amine cross-linkers for promoting plastisol adhesion. Any suitable amine cross-linker may be used in the acrylic plastisol composition. Suitable amine cross-linkers include modified polyamidoamine PVC plastisol adhesion promoters. Exemplary modified polyamidoamine PVC plastisol adhesion promoters include NOURYBOND®270, NOURYBOND®272, and NOURYBOND®276. The one or more cross-linkers may comprise at least 0.05 wt. %, 1 wt. %, 2 wt. %, 4 wt. %, 5 wt. %, 7 wt. % or 9 wt. %. The one or more cross-linkers may comprise up to 1 wt. %, 2 wt. %, 4 wt. %, 5 wt. %, 7 wt. %, 9 wt. %, or 10 wt. %.

The ratio of latent NCO/amine functional units may from about 0.1 to about 1 in the plastisol composition.

The temperature range for thermal curing and/or deblocking may be from 100° C. to 200° C., preferably at 110° C. to 130° C., more preferably about 120° C. The plastisol composition may be cured for at 120° C. for a period of about 30 minutes.

EXAMPLES

Objects and advantages of the embodiments described herein are further illustrated by the following examples. The particular materials and amounts thereof, as well as other conditions and details, recited in these examples should not be used to limit embodiments described herein. Unless stated otherwise all percentages, parts and ratios are by weight. Examples of the invention are numbered while comparative samples, which are not examples of the invention, are designated alphabetically.

A description of the raw materials used in the examples is as follows.

Isocyanate A is TDI-100, a compound of 2,4-toluene diisocyanate commercially available as Coronate T100 from Nippon Polyurethane Co., Ltd.

Isocyanate B is a polymeric MDI with an average molecular weight of about 290 and an approximate functionality of 2.3, available from The Dow Chemical Company under the trade designation PAPI™2940.

Polyol A is a 4.0 functional amine initiated polyol (3,3'-diamino-N-methyl dipropylamine) having a hydroxyl number of 57 mgKOH/g and an equivalent weight of 1,000 available from The Dow Chemical Company under the trade designation VORANOL™VORACTIV™ 7000 polyol.

Polyol B is a propylene glycol initiated diol having a molecular weight of approximately 2,000 available from The Dow Chemical Company under the trade designation VORANOL™2120 polyol.

Polyol C is a propylene glycol initiated diol having a molecular weight of approximately 3,000 available from The Dow Chemical Company under the trade designation VORANOL™WD2130 polyol.

Polyol D is a triol polyether polyol, capped, having a hydroxyl number of 34 mgKOH/g and a molecular weight of approximately 5,000 available from The Dow Chemical Company under the trade designation VORANOL™4701 polyol.

Polyol E is a triol polyether polyol having a molecular weight of approximately 4,000 available from The Dow Chemical Company under the trade designation VORANOL™230-042 polyol.

The acrylic resin powder is an acrylic resin powder available from the Mitsubishi Rayon Co. Ltd. under the trade designation DIANAL™LP-3106 polyol.

The calcium carbonate is calcium carbonate available from the Shiraishi Chemical Co., Ltd., under the trade designation Whiton SSB calcium carbonate.

The plastisol adhesion promoter is a modified polyamidoamine PVC plastisol adhesion promoter available from Air Products under the trade designation NOURYBOND®276 promoter.

Examples 1 to 3 and Comparative Samples A to C.

For each of Examples 1 to 3 and Comparative Samples A to C, the amounts and types of polyol and isocyanate in Table 1 are combined in a glass reactor having an approximate volume of 500 ml and stirred under a blanket of nitrogen. The polyol and isocyanate are reacted at a temperature of 80 degrees Celsius uncatalyzed for a period of approximately four hours to form an isocyanate terminated prepolymer. The resulting isocyanate terminated prepolymer is then characterized for free isocyanate content. The blocking agent is blended with the isocyanate terminated prepolymer to form the blocked prepolymer. The resulting blocked prepolymer is then characterized for free isocyanate content to confirm completion of the blocking reaction. Formulations used for producing the prepolymers are provided in Table I. Comparative Samples 4 and 5 are blocked prepolymers based on TDI and VORANOL™ polyols. Comparative Sample 6 is a blocked prepolymer based on MDI and VORANOL™ polyols. TAKENATE® B7105 is a competitive sample available from Mitsui Chemical and based on polyoxypropylene polyol having a molecular weight of about 5,000 and blocked by MEKO.

The plastisol formulations incorporating the prepolymers depicted in Examples 1 to 3 and Comparative Samples A to C are formed by mixing the prepolymers with the components depicted in Table II and cured at 120 degrees Celsius for 30 minutes.

The physical properties of the plastisol formulations incorporating the prepolymers depicted in Examples 1 to 3 and Comparative Samples A to C are depicted in Table III. Shore A hardness is determined using JIS K6251 Durometer Type A and methods corresponding to ISO 48:94 and ISO 7619:97. Tensile strength and elongation are determined using JIS K6251 Dampbel No. 3 and methods corresponding to ISO 37:94. Viscosity of the prepolymer samples is determined using a Brookfields viscometer according to ASTM D4889.

TABLE I

Prepolymer Formulations.

| Raw material | Detail | Inventive Examples | | | Comparative Examples | | | TAKENATE ® B7105 (Mitsui) |
|---|---|---|---|---|---|---|---|---|
| | | 1 | 2 | 3 | A | B | C | |
| Isocyanate A | TDI 100 | 7 | 9 | 9 | 9 | 9 | — | — |
| Isocyanate B | Polymeric MDI | — | — | — | — | — | 11 | — |
| Polyol A | Amine initiated polyol | 4 | 4 | 2 | — | — | — | — |
| Polyol B | PPG2000 homo | — | — | — | — | — | 14 | — |
| Polyol C | PPG3000 homo | — | — | — | — | — | 54 | — |
| Polyol D | Triol polyether polyol, EO capped, M.W. 5000 | 87 | 83 | — | 87 | — | — | — |

TABLE I-continued

Prepolymer Formulations.

| Raw material | Detail | Inventive Examples | | | Comparative Examples | | | TAKENATE ® |
|---|---|---|---|---|---|---|---|---|
| | | 1 | 2 | 3 | A | B | C | B7105 (Mitsui) |
| Polyol E | Tirol polyether polyol, homo, M.W. 4000 | — | — | 85 | — | 87 | — | — |
| DINP | Diisononyl phthalate | — | — | — | — | — | 19 | — |
| MEKO | Methyl ethyl ketone oxime | 2 | 4 | 4 | 4 | 4 | 2 | — |
| | Total | 100 | 100 | 100 | 100 | 100 | 100 | — |
| | Benzoyl chloride, ppm | 100 | 100 | 100 | 100 | 100 | 100 | — |
| | Latent NCO % | 1% | 2% | 2% | 2% | 2% | 1% | 2% |
| | Blocked prepolymer viscosity, Pa·s | 69,300 | 30,600 | 19,500 | 17,500 | 17,500 | 377,000 | 46,900 |

TABLE II

Plastisol Formulation

| Raw material | Detail | Supplier | Parts |
|---|---|---|---|
| Dianal LP-3106 | Acrylic resin powder | Mitsubishi rayon | 70 |
| Whiton SSB | CaCO$_3$ | Shiraishi calcium | 110 |
| DINP | Diisononyl phthalate | J-ester | 84 |
| Blocked prepolymer | | | 23 |
| Amine | Nourybond 276 | Polyamide amine | 6 |

TABLE III

Plastisol Physical Properties

| Plastisol physical property | Inventive Examples | | | Comparative Examples | | | TAKENATE ® |
|---|---|---|---|---|---|---|---|
| | 1 | 2 | 3 | A | B | C | B7105(Mitsui) |
| Shore A hardness | 59 | 56 | 57 | 56 | 58 | 60 | 57 |
| Tensile strength, Mpa | 2.75 | 2.04 | 2.16 | 1.84 | 1.87 | 1.74 | 1.90 |
| Elongation, % | 460 | 452 | 401 | 404 | 356 | 321 | 339 |

The data in Table III shows superior tensile strength and elongation properties for plastisols comprising the inventive blocked prepolymer of Examples 1 to 3, which are 11-16% and 12-13% higher than the Comparative Samples A to C and TAKENATE® B7105. The examples and comparative samples all have comparable hardness.

For adhesive and sealants applications, addition of prepolymers based on the self catalytically active polyol having an amine initiator described herein can reduce the use of amine catalyst and volatile organic compounds (VOCs) in the formulations. Normally, amine initiated polyols with higher functionality (e.g., >2) and lower molecular weight tend to be used for polyurethane rigid foam applications or as curatives for polyurethane elastomer applications because of their high reactivity and high functionality. The inventors have found that plastisol compositions comprising the inventive blocked prepolymer described herein afford better tensile strength and elongation compared to currently available products.

While the foregoing is directed to embodiments of the invention, other and further embodiments of the invention may be devised without departing from the basic scope thereof.

What is claimed is:

1. A blocked prepolymer which is the reaction product of at least:
   (a) an isocyanate terminated prepolymer which is the reaction product of at least:
      (1) one or more polyols comprising at least one polyol having a tertiary amine initiator, wherein the at least one polyol having a tertiary amine initiator comprises at least 1 percent by weight and up to 15 percent by weight of the blocked prepolymer; and
      (2) a stoichiometric excess of one or more organic polyisocyanate components; and
   (b) a blocking agent;
   wherein the stoichiometric excess of isocyanate to alcohol moieties (NCO:OH) is from 1.20:1 to 4:1.

2. The blocked prepolymer of claim 1, wherein the one or more polyols further comprise at least one of one or more polyether polyols, one or more polyester polyols, and one or more polycarbonate polyols.

3. A blocked prepolymer which is the reaction product of at least:
   (a) an isocyanate terminated prepolymer which is the reaction product of at least:
      (1) one or more polyols comprising at least one polyol having a tertiary amine initiator; and
      (2) a stoichiometric excess of one or more organic polyisocyanate components; and
   (b) a blocking agent;
   wherein:
   the stoichiometric excess of isocyanate to alcohol moieties (NCO:OH) is from about 1.1:1 to about 4:1, and the at least one polyol having is obtained by alkoxylation of the tertiary amine initiator having the formula:

$$H_mA\text{-}(CH_2)_n\text{---}N(R)\text{---}(CH_2)_p\text{-}AH_m \qquad (I)$$

wherein n and p are independently integers from 2 to 6;
A at each occurrence is independently oxygen, nitrogen, or sulphur;
R is a C1 to C3 alkyl group; and
m is 1 when A is oxygen and m is 2 when A is nitrogen.

4. The blocked prepolymer of claim 3, wherein:
the at least one polyol having the tertiary amine initiator comprises from about 1 to 5 percent by weight of the blocked prepolymer;
the one or more organic polyisocyanate components comprise from about 5 to 20 percent by weight of the blocked prepolymer;
the blocking agent comprises from about 1 to 10 percent by weight of the blocked prepolymer; and
the one or more polyols further comprising from about 70 to 90 percent by weight of the blocked prepolymer of an ethylene oxide capped polyoxypropylene triol.

5. The blocked prepolymer of claim 3, wherein the at least one polyol having a tertiary amine initiator is a methylimino bis-propylamine initiated EO/PO polyoxyalkylene ether copolymer.

6. The blocked prepolymer of claim 1, wherein the blocking agent is selected from a group consisting of oximes, phenols, pyrazole, lactam, amines, and combinations thereof.

7. The blocked prepolymer of claim 6, wherein the one or more polyisocyanate components is toluene diisocyanate (TDI), the blocking agent is methyl ethyl ketoxime (MEKO), the at least one polyol having a tertiary amine initiator has a hydroxyl number of 35 to 100 and the one or more polyols further comprises an ethylene oxide capped polyoxypropylene triol.

8. An acrylic plastisol composition which is the reaction product of:
a blocked prepolymer which is the reaction product of:
an isocyanate terminated prepolymer which is the reaction product of at least:
the one or more polyols comprising at least one polyol having a secondary amine initiator or a tertiary amine initiator; and
a stoichiometric excess of one or more organic polyisocyanate components; and
a blocking agent
one or more acrylic powders;
one or more plasticizers;
one or more amine cross-linkers; and
optionally, one or more fillers.

9. The acrylic plastisol composition of claim 8, wherein the blocked prepolymer is the reaction product of:
from about 1 to 5 percent by weight of the at least one polyol having a tertiary amine initiator;
from about 5 to 20 percent by weight of the one or more organic polyisocyanate components;
from about 70 to 90 percent by weight of an ethylene oxide capped polyoxypropylene triol; and
from about 1 to 10 percent by weight of the blocking agent.

10. The acrylic plastisol composition of claim 8, comprising:
from about 5 to 50% by weight of the blocked prepolymer;
from about 50 to 95% by weight of the one or more acrylic powders; and
from about 10 to 100 parts per hundred plastisol of the one or more fillers.

11. The acrylic plastisol of claim 10, wherein the at least one polyol is obtained by alkoxylation of at least one tertiary amine initiator molecule of the formula:

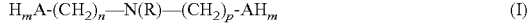
$$H_mA\text{-}(CH_2)_n\text{---}N(R)\text{---}(CH_2)_p\text{-}AH_m \qquad (I)$$

wherein n and p are independently integers from 2 to 6;
A at each occurrence is independently oxygen, nitrogen, or sulphur;
R is a C1 to C3 alkyl group; and
m is 1 when A is oxygen and m is 2 when A is nitrogen.

12. The acrylic plastisol composition of claim 11, wherein the at least one polyol having a tertiary amine initiator is a methylimino bis-propylamine initiated EO/PO polyoxyalkylene ether copolymer, the one or more polyisocyanate components is toluene diisocyanate (TDI), the blocking agent is methyl ethyl ketoxime (MEKO), and the one or more polyols further comprises an ethylene oxide capped polyoxypropylene triol.

13. The acrylic plastisol composition of claim 8, wherein the one or more acrylic powders is selected from a group of polymers consisting of acrylic vinyl monomer, α,βethylenic unsaturated carboxylic ester, diene monomer, vinyl ester monomer, vinyl cyanide, α,βethylenic unsaturated carboxylic acid, epoxy monomer, and combinations thereof.

14. The acrylic plastisol composition of claim 13, wherein the one or more plasticizers is selected from a group consisting of Di-Isononylphthlate (DINP), Di-Isodecylphthlate (DIDP), and combinations thereof.

\* \* \* \* \*